United States Patent
Koesters et al.

(10) Patent No.: US 11,465,394 B2
(45) Date of Patent: Oct. 11, 2022

(54) PLASTIC FILM COMPOSITE, FILM PACKAGING AND METHOD FOR THE PRODUCTION OF PACKAGING CONTAINERS

(71) Applicant: Mondi AG, Vienna (AT)

(72) Inventors: Jens Koesters, Wallenhorst (DE); Jochen Brauer, Lohne (DE)

(73) Assignee: Mondi AG, Vienna (AT)

( * ) Notice: Subject to any disclaimer, the term of this patent is extended or adjusted under 35 U.S.C. 154(b) by 0 days.

(21) Appl. No.: 16/713,092

(22) Filed: Dec. 13, 2019

(65) Prior Publication Data
US 2020/0189248 A1    Jun. 18, 2020

(30) Foreign Application Priority Data

Dec. 14, 2018   (DE) .................... 10 2018 132 333.6

(51) Int. Cl.
  B32B 27/08  (2006.01)
  B32B 27/32  (2006.01)
  B32B 27/20  (2006.01)
  B32B 1/00   (2006.01)

(52) U.S. Cl.
  CPC .............. *B32B 27/08* (2013.01); *B32B 27/32* (2013.01); *B32B 2250/242* (2013.01); *B32B 2274/00* (2013.01); *B32B 2307/514* (2013.01); *B32B 2307/732* (2013.01); *B32B 2367/00* (2013.01); *B32B 2439/40* (2013.01)

(58) Field of Classification Search
  None
  See application file for complete search history.

(56) References Cited

U.S. PATENT DOCUMENTS

| 4,784,885 A * | 11/1988 | Carespodi | B32B 7/06 428/36.8 |
| 5,091,241 A * | 2/1992 | Lang | B32B 27/32 428/213 |
| 2009/0075032 A1* | 3/2009 | Rutter | B65B 41/18 428/194 |

(Continued)

FOREIGN PATENT DOCUMENTS

| DE | 102005023337 A1 | 11/2006 |
| EP | 1167017 A1 | 1/2002 |

(Continued)

OTHER PUBLICATIONS

German Search Report dated Jun. 25, 2019 in corresponding German Application 10 2018 132 333.6 (with English translation of relevant parts).

(Continued)

*Primary Examiner* — Ramsey Zacharia
(74) *Attorney, Agent, or Firm* — Collard & Roe, P.C.

(57) ABSTRACT

A plastic film composite for film packaging with an oriented outer film and a sealing film which differs from the outer film, both of which outer film and sealing film are either polyethylene-based or polypropylene-based. The outer film and the sealing film are connected by a polyolefin-based extrusion lamination comprising at least one layer. A film packaging comprising the plastic film lamination and a method for the production of packaging containers uses the plastic film composite.

24 Claims, 7 Drawing Sheets

(56) References Cited

U.S. PATENT DOCUMENTS

| | | | |
|---|---|---|---|
| 2010/0111453 A1* | 5/2010 | Dierl | B65B 9/213 |
| | | | 383/204 |
| 2011/0135916 A1* | 6/2011 | Lu | B32B 27/18 |
| | | | 428/336 |
| 2013/0052470 A1* | 2/2013 | Botros | B32B 9/00 |
| | | | 428/476.3 |
| 2020/0223185 A1* | 7/2020 | Christensen | B32B 37/153 |
| 2020/0346440 A1* | 11/2020 | Pey | B32B 27/32 |

FOREIGN PATENT DOCUMENTS

| | | | |
|---|---|---|---|
| EP | 2186741 A1 | 5/2010 | |
| EP | 2987744 A1 | 2/2016 | |
| WO | 2007115816 A1 | 10/2007 | |
| WO | WO-2017102704 A1 * | 6/2017 | B32B 27/08 |

OTHER PUBLICATIONS

DIN 53 357 dated Oct. 1982, Preisgr. 5, Vertr.-Nr. 0005, Alleinverkauf der Normen durch Beuth Verlag GmbH, Berlin, Oct. 30, 1982 (with partial English translation).

* cited by examiner

PLASTIC FILM COMPOSITE, FILM PACKAGING AND METHOD FOR THE PRODUCTION OF PACKAGING CONTAINERS

CROSS-REFERENCE TO RELATED APPLICATIONS

This application claims priority under 35 USC 119 of German Application No. DE10 2018 132 333.6, filed on Dec. 14, 2018, the disclosure of which is herein incorporated by reference.

BACKGROUND OF THE INVENTION

The invention is directed to a plastic film composite for film packaging with an oriented outer film and a sealing film which differs from the outer film, both outer film and sealing film being either polyethylene-based or polypropylene-based. The subject matter of the invention is further a film packaging formed from the plastic film composite and a method for producing packaging containers.

Various plastic film packaging composites are known from practice having a layer sequence that is optimized with respect to the production of the film packaging and the visual appearance of the film packaging.

As is also described in EP 2 186 741 B1, polyethylene terephthalate (PET) is frequently employed for the outer film and polyethylene is used for a sealing film provided as inner film in order to achieve a good heat-sealability and a high-quality visual appearance of a film packaging bag. However, this construction which is common in practice has the disadvantage that a single-stream recycling of the gusseted bag is not possible.

A gusseted bag which is formed substantially homogeneously from polyethylene and a method for production are known from EP 2 987 744 E31. In generic plastic film composites according to a preferred configuration, an oriented outer film and a sealing film are first produced separately and then glued to the polyurethane base by means of a two-component adhesive.

For reasons of cost, with a view to good recycling and in consideration of the curing behavior, an adhesive layer of this kind is formed to be very thin with a typical thickness of 2 μm. Also, a heavier application of adhesive does not lead to a stronger composite adhesion.

The orientation of the outer film results in a higher melting temperature or softening temperature compared to a polymer that is not oriented. For example, when the outer film and the sealing film are both polypropylene-based or are both polyethylene-based, orientation as regards a fusing of the film to the sealing layer by heat-sealing seams can prevent the outer film from also fusing to the sealing layer. The outer film also obtains improved visual characteristics and increased stiffness by means of the orientation, which is advantageous as regards a high-quality visual appearance.

However, in the case of the known generic plastic film composite it has been shown in practice that the formed sealing seams can present weak points during shock loading. For example, when a filled, tightly closed packaging bag formed from the plastic film composite falls down from typical drop heights of 1 meter, a tear is often observed directly adjacent to the sealing seam, i.e., at the seam root of the sealing seam. The plastic film composite then tears at that location without substantial elongation.

SUMMARY OF THE INVENTION

In view of the foregoing, it is the object of the present invention to minimize the disadvantages occurring in the prior art. In particular, the risk of tearing in the area of a sealing seam is to be reduced in film packaging formed from the plastic film composite. Beyond this, a corresponding film packaging and a method for producing packaging containers are to be provided.

This object is met by the subject matter of the invention which is a plastic film composite in which the outer film and the sealing film are connected, possibly while incorporating further intermediate layers and/or intermediate films, by a polyolefin-based extrusion lamination comprising at least one layer.

If the outer film and the sealing film are polyethylene-based within the framework of the invention, the extrusion lamination advisably also has polyethylene as main constituent. Correspondingly, polypropylene is provided as main constituent for the extrusion lamination when the outer film and the sealing film are polypropylene-based.

Within the meaning of the present invention, the outer film and the sealing film, respectively, are polyethylene-based or polypropylene-based when the corresponding polymer class forms the main constituent and—at least with respect to the polymer contents—is present in an amount of at least 50% by weight.

By "polymer class" within the framework of the invention is meant polyethylene (PE) and polypropylene (PP). It will be appreciated that different polymer types, copolymers and blends can be provided for the outer film, the sealing film and individual layers of outer film and sealing film. Within the framework of the invention, polymer types of all common density ranges are contemplated. According to a preferred configuration of the invention, the polyethylene polymer class also includes polyethylene copolymers, for example, EVA, EAA, EMA, etc. In the polypropylene polymer class, PP/PE copolymers such as PP-RC and PP-BC, for example, are also contemplated. Further, polyolefin copolymers with elastic properties (TBE-O) are also known. The above-described variations within the PP and PE polymer classes can also be provided for the extrusion lamination comprising at least one layer.

The composite adhesion between the outer film and the inner film can be strengthened compared to a conventional lamination by means of adhesive in that the outer film and the sealing film within the framework of the invention are connected through an adapted polyolefin-based extrusion lamination comprising at least one layer.

In this connection, it is noted that polyolefins have a comparatively low surface tension and bond poorly compared to polar plastics such as polyethylene terephthalate (PET) or polyamide (PA), for example. There is also an increased crystallinity in the oriented outer film, which explains why the surface is also more difficult to activate through known processes such as, for example, a corona treatment. Lastly, the outer film is less rough and is smoother overall as a result of the orientation, which is also desirable especially with regard to a high-quality visual appearance. However, the composite strength is also reduced during bonding.

In spite of these limitations, the composite adhesion is sufficient, especially as concerns PUR adhesives, to prevent areal delamination for common plastic film composites of the prior art which have oriented polyolefin layers.

However, the present invention is based on the insight that by strengthening the composite adhesion, the impact resistance of film packaging at sealing seams can be substantially increased with respect to the tensile forces operating under a mechanical load, even though the composite adhesion, per se, relates to the strength of the plastic film composite in thickness direction.

Accordingly, as regards the operative tensile forces in the area of the sealing seams during a drop test, the outer film and the sealing film cannot be considered in isolation from one another. On the contrary, the strength is determined by the plastic film composite in its entirety and, therefore, also by the composite adhesion of the outer film and sealing film.

It is assumed that a number of aspects play a part with respect to these surprising results. First, it should be noted that the oriented outer film on the one hand, which is preferably oriented in a machine direction, and the sealing film on the other hand, which is preferably formed as a single blown film, have an appreciably different shrinkage behavior when acted upon by heat. Accordingly, during the production of a sealing seam, substantial stresses may arise in the material which are conducive to tearing in the area of the sealing seam and particularly at the seam root, i.e., at the edge of the sealing seam. Thinning can also result from the influence of pressure and temperature during the production of a sealing seam, which is conducive to tearing. Further, exposure to heat can also result in damage to the polymer structure. Lastly, the tensile forces operating during the production of film packaging can also negatively affect the structure and strength of sealing seams.

It may also be assumed that with tensile stress on a previously formed sealing seam and with a low composite adhesion according to the prior art, the outer film on the one hand and the sealing film on the other hand can tear one after the other and the strengths can therefore not be summed.

Further, it must be considered that the extrusion lamination is also appreciably thicker than a conventional layer of adhesive. The extrusion lamination typically has a layer thickness greater than 5 µm, particularly preferably greater than 10 µm. In particular, the layer thickness can amount to between 12 µm and 28 µm. Accordingly, the extrusion lamination contributes to a certain stabilizing of the entire plastic film composite simply because of the typical layer thickness.

Apart from an improved bonding of the extrusion lamination to the outer film and the sealing film (possibly while incorporating further intermediate layers and intermediate films), the polymer of the extrusion lamination is also extensively unaligned and is accordingly initially favorably expandable and soft. Therefore, it is also assumed that a more homogeneous distribution and a cushioning effect will be achieved as a result of these characteristics precisely as regards the internal stresses resulting during sealing with respect to the operative forces. This may be particularly important when plastic packaging is exposed to a sudden strong force when dropped or by an impact such as occurs during a drop test. Consequently, it is assumed that the improved mechanical characteristics result from a combination of different aspects.

The extrusion lamination is advisably adapted to the adjoining material of the outer film and sealing film in order to achieve an optimal composite adhesion.

As previously stated, the extrusion lamination is commonly formed based on polyethylene even though the outer film and the sealing film comprise chiefly polyethylene. Correspondingly, polypropylene is selected as main constituent for the extrusion lamination when the outer film and the sealing film likewise have polypropylene as main constituent.

Beyond this, however, an adaptation with respect to density and viscosity is also advisable so that there are no large differences between the adjoining layers of the outer film and sealing film. In this regard, it is also particularly important that the polymer is introduced in melt flow between the outer film and the inner film during the extrusion lamination. In so doing, the adjoining areas of the outer film and sealing film can also be softened and at least superficially fused so that a particularly intimate bond results there. Such a bond is ultimately also promoted by pressing the plastic film composite in a roll nip.

Proceeding from this basic concept, there are various possibilities for variation within the framework of the invention.

In particular, the extrusion lamination can be configured to have multiple layers. An optimal bonding to the outer film and to the sealing film can be achieved as a result of a multiple-layer extrusion lamination when the extrusion lamination directly adjoins the outer film and the sealing film according to a preferred configuration of the invention.

Within the framework of the invention, various approaches may be pursued in order to achieve the strongest possible composite adhesion between the extrusion lamination and the outer film and sealing film, respectively.

According to a first approach, it is provided that the extrusion lamination has, as a main constituent in a layer adjoining a contact layer of the outer film, a polymer of the same polymer class as that provided as main constituent in the contact layer. If the outer film is produced as a monofilm, it comprises only the contact layer described above. In case of a multiple-layer configuration of the outer film, the contact layer faces the extrusion lamination.

If, for example, the outer film has high-density polyethylene (HDPE) as main constituent throughout or only at the contact layer, the directly adjoining layer of the extrusion lamination can also have HDPE as main constituent. Like considerations apply to other suitable materials. It may be advisable that the difference in density between the directly adjoining layers described above is less than 0.01 g/cm$^3$.

In addition to an adjustment of the density, it is also advisable that the layers directly adjoining one another have a similar viscosity and a similar melting temperature and softening temperature. That is, this makes it possible for the polymers of the same polymer class which have good mutual compatibility to also be blended to a certain extent in the contact area and are accordingly anchored in a particularly advantageous manner to strengthen the composite adhesion.

Additionally or alternatively, it can be provided that the extrusion lamination is provided with adhesive properties or other properties strengthening the composite adhesion in a layer adjoining the outer film. Corresponding steps are particularly advisable when the outer film has an imprint (reverse printing) in direction of the extrusion lamination according to a variant of the invention. While polyethylene and polypropylene are usually nonpolar or minimally polar, substances typically provided for an imprint have a high polarity so that an increased polarity and, in particular, incorporation of polar groups or portions in the polymer chains may also be advisable with regard to the adjoining layer of the extrusion lamination. For example, the extrusion lamination can have a maleic anhydride grafted copolymer in the layer adjoining the outer film. When the associated contact layer of the outer film is polyethylene-based, for example, the adjoining layer of the extrusion lamination can have an ethylene-acrylic acid-maleic anhydride (EAA-MAH). Maleic anhydride grafted polyolefin or polyolefin copolymer or another polyolefin or polyolefin copolymer with (highly) polar groups bonds well to a polyolefin-based adjoining layer on the one hand and to polar layers, for example, typical printing inks, on the other hand.

Additionally or alternatively, further polymers having certain adhesive and/or elastic properties can also be provided to strengthen the composite adhesion. Accordingly, it is provided according to a further additional or alternative aspect of the invention that the extrusion lamination has, in a layer adjoining the outer film, a thermoplastic elastomer (TPE) as admixture typically with a weight proportion of between 3 and 50% by weight, preferably between 5 and 20% by weight. Olefin-based (TPE-O) thermoplastic elastomers or styrene block (TPE-S) thermoplastic elastomers are preferred. For example, a styrene/ethylene butene/styrene copolymer which can likewise be grafted with maleic anhydride is suitable.

While the outer film is typically oriented with a draw ratio of between 1:3 and 1:14 according to the present invention, the sealing film does not have an orientation of this kind. In accordance with the usual definition of the term in film sheeting production, "orientation" is understood to mean a separate method step in which the polymers are oriented in a cold or, if necessary, warm state after the actual film extrusion without the polymer chains being able to align in melt flow.

An orientation is provided particularly in machine direction, and the cold or, if necessary, warm film is then guided in a particularly simple manner over rolls which are driven at different speeds and is therefore drawn in machine direction, i.e., in longitudinal direction. Provided no slippage occurs, the draw ratio is given by the web speed at the surface of the respective rolls.

With a draw ratio of 1:3, for example, a film portion with an initial length of 1 meter is stretched to a length of 3 meters. Apart from a lateral necking of the material web which cannot always be entirely ruled out, the film thickness is simultaneously reduced counter to the lengthening of the film by the orientation.

The sealing film can be formed in one or more layers in a particularly advantageous manner by blown film extrusion. Even if the polymers are aligned to a certain extent during the blown film extrusion by the inflation of the formed film tubing, this alignment is not designated as an orientation within the meaning of the invention. In contrast to an oriented film, particularly a film oriented in machine direction (regardless of whether or not this film is initially produced as a flat film or as a blown film), conventional blown films are heat-sealable and are also to be connected to other film layers by adhesive with a strong composite adhesion.

The above-described steps for optimizing the composite adhesion with respect to bonding to the outer film may also be taken into account in principle for the layer transition to the sealing film. Due to the particular characteristics of the oriented outer film, however, the problem of weak composite adhesion in the prior art is of particular importance precisely in this respect.

Within the framework of the invention, the outer film can be formed in one or more layers by flat film extrusion as well as by blown film extrusion. When the outer film is formed by flat film extrusion, the draw ratio is typically between 1:8 and 1:14, particularly between 1:9 and 1:12.

In contrast, when the outer film is formed by blown film extrusion, the draw ratio is usually between 1:3 and 1:8, particularly between 1:4 and 1:7. Accordingly, compared to flat films, a smaller draw ratio is provided in blown films because unwanted irregularities are often observed in the surface above the indicated ranges for a blown film.

However, the indicated draw ratios are merely preferred and can also lie outside of the above-mentioned parameter ranges particularly depending on the exact procedure during flat film extrusion or blown film extrusion and depending on the materials employed.

According to a preferred configuration of the invention, the outer film has at least one layer with medium-density polyethylene (MDPE) or particularly preferably high-density polyethylene (HDPE) as main constituent. Correspondingly, the medium-density polyethylene or high-density polyethylene makes up at least 50% by weight.

High-density polyethylene is characterized on the one hand by low costs and, especially in the stretched state and particularly stretched monoaxially in machine direction, by particularly advantageous mechanical characteristics.

Within the framework of the invention, the term high-density polyethylene (HDPE) typically refers to a density range of from 0.94 to 0.97 $g/cm^3$. Medium-density polyethylene (MDPE) designates a density range of from 0.93 to 0.94 $g/cm^3$. Low-density polyethylene designates a density range of from 0.915 to 0.93 $g/cm^3$.

The outer film or at least a layer of the outer film can also be formed from HDPE in its entirety or by a percentage of more than 80%, more than 90% and particularly more than 95%. It will be appreciated that types obtained with metallocene catalysts (HDPE (M)) are also contemplated.

According to a further development of the invention, it is provided that the outer film is formed to have multiple layers and, in particular, is coextruded. For example, the outer film can be coextruded in three layers, and with an at least three-layer construction of this kind, for example, cover layers with low-density polyethylene as main constituent are then provided. In a three-layer construction, cover layers comprising low-density polyethylene or with low-density polyethylene (LDPE) as main constituent are combined in a particularly advantageous manner with a core layer of HDPE or with HDPE as main constituent. The particularly advantageous mechanical characteristics of HDPE are then provided by the core layer, while an improved connection through the extrusion lamination is also possible by means of the low-density polyethylene cover layers. The low-density polyethylene can also be provided in linear form (LLDPE) or as polyethylene copolymer. It will be appreciated in this case that types obtained with metallocene catalysts (LLDPE(M)) are also contemplated.

The thickness of the outer film is typically between 20 μm and 80 μm, preferably between 30 μm and 60 μm.

Film packaging is often provided with an imprint. Accordingly, it can be provided within the framework of the invention that the outer film has an imprint. Regarding the strongest possible composite adhesion between the outer film and the sealing film within the framework of the invention, the imprint can be provided on the side of the outer film that faces the sealing film and the extrusion lamination. With reference to the film packaging to be formed, the imprint is then located on the outer side of the film packaging. While there is a risk of rubbing off in an arrangement of this kind, the composite adhesion relative to the extrusion lamination is not affected. An imprint of this kind on the exposed outer side of the outer film is also referred to as front-side printing.

A reverse printing on the side of the outer film facing the extrusion lamination which is generally preferred for purposes of protecting the imprint may also be possible within the framework of the invention particularly when the imprint does not cover the entire surface. Taking into account that the laminating strength is impaired by reverse printing of this kind, portions with low laminating strength are generated in the area of the outer film contacting the extrusion lamination where the imprint is located and portions with high laminating strength are generated where an imprint is omitted. Stabilizing anchor points or anchor surfaces are then generated to a certain extent through the blank areas.

With respect to the film packaging which will be described in more detail later and which is formed from the plastic film composite, it can also be provided according to a preferred configuration of the invention that a reverse printing is omitted precisely in those areas where heat-sealing seams are generated subsequently. A particularly strong composite adhesion is then ensured precisely in those areas where particularly high forces act on the film packaging during a fall or an impact by omitting the imprint.

Accordingly, it can be provided in a corresponding manner that the outer film is imprinted (reverse printing) on its inner side in direction of the extrusion lamination, and the imprint extends over 10% to 95% of the surface area of the outer film, for example. Preferably, more than 20% of the surface area is imprinted. It is likewise preferable that less than 90% of the surface area is imprinted. In every case, an imprint is not formed over the entire surface so that there is provided the above-described anchor points or areas which can also be arranged especially at the positions of sealing seams which are to be formed subsequently.

As will be described later, an imprint not covering the entire surface is possible and advisable especially when the sealing film is colored, for example, by a white pigment. The sealing film then forms a uniform background for the imprint not covering the entire surface, resulting in a uniform high-quality visual appearance.

As has already been stated, the sealing film can be formed in one or more layers by blown film extrusion. Typically, the thickness of the sealing film is between 30 μm and 140 μm, particularly between 50 μm and 100 μm. The thickness of the sealing film is selected such that, on the one hand, a sufficient stability of the composite, a good processing during lamination and good sealability can be achieved. When the sealing film is too thin, handling may be difficult during lamination and also the material available for a reliable sealing may not be sufficient. Excessive thickness may ultimately result in an excessive overall thickness and also in high costs for the entire plastic film composite.

According to a preferred configuration of the invention, the sealing film is formed based on low-density polyethylene, including linear low-density polyethylene and types obtained by metallocene catalysts (LDPE, LLDPE, LLDPE (M)). The various types can also be blended in particular.

As has already been stated in connection with the imprint which is preferably provided on the outer film, the sealing film can contain a pigment, particularly a white pigment. For example, titanium dioxide ($TiO_2$) is suitable as a typical white pigment. The sealing film then forms a uniform background for the imprint.

When the sealing film is constructed with multiple layers, particularly at least three layers, according to a preferred configuration of the invention, the pigment can also be provided only in case of an inner layer of the sealing film.

As regards a favorable recycling of the plastic film composite, the latter is to be formed as homogeneously as possible. The total weight proportion of polyolefin relative to the polymer constituents of the film or also relative to the entire film is at least 80% by weight, particularly preferably at least 90% by weight and particularly at least 95% by weight. Apart from small amounts of processing aids, color pigments or the like, the plastic film composite can be formed homogeneously with respect to a polymer class, i.e., particularly with respect to PP or with respect to PE. According to a further development of the invention, polyolefin is also present in the individual layers of the film in an amount of at least 80% by weight, particularly preferably at least 90% by weight and particularly at least 95% by weight either relative to the polymer constituents or preferably relative to the total mass of the corresponding layer.

With regard to the possibility of recycling, it is also particularly advantageous to omit divergent polymer classes as admixture as well as metal layers and/or metallization.

When the indicated weight proportions relate only to the polymer constituents, typical fillers and pigments may be contained in large amounts in principle. Whether or not corresponding materials are problematic with respect to recycling depends particularly on the form of recycling. It is self-evident that a particularly favorable and versatile recycling is possible when the polyolefin has the highest possible purity in relation to the weight proportion and in particular a determined polymer class (PP or PE) is present.

The total thickness of the plastic film composite typically amounts to between 50 μm and 200 μm, particularly between 80 μm and 150 μm.

According to a preferred configuration of the invention, the composite adhesion between the outer film and the sealing film determined in a peel test according to DIN 53357 is greater than 2 N/15 mm, preferably greater than 2.5 N/15 mm, particularly preferably greater than 3 N/15 mm. The composite adhesion can lie in a range between 3.5 N/15 mm and 9 N/15 mm. The force required for separation in newtons is scaled to the width of the sample.

The subject matter of the invention is also a film packaging, in particular in the form of a film packaging bag, comprising the above-described plastic composite. The outer film forms an outer side, the sealing film faces an interior of the packaging, and the interior of the packaging is bounded by at least one heat-sealing seam formed at the sealing film. In order that the sealing film can be connected to itself at the heat-sealing seam, a corresponding portion of the plastic film composite can be folded upon itself. Alternatively, a plurality of cuts in the plastic film composite can also be joined by heat-sealing seams to form a bag body.

The exact production method by folding and heat sealing and/or the joining together of a plurality of portions by heat sealing is not limited within the scope of the invention.

Correspondingly, the film packaging can also be formed as a premade bag which is not filled until subsequently in a separate filling operation and is closed. Alternatively, the plastic film composite can also be employed in a combined shaping and filling process. Corresponding processes are referred to in practice as FFS process (form-fill-seal process) which can be carried out both horizontally (HFFS) and vertically (VFFS). The plastic film composite is also suitable for other packaging applications and purposes. For example, use as cover film for foodstuffs packaging or liquid packaging is also contemplated. A receptacle body can be formed in the manner of a shell or a bucket by deep drawing.

All of the joints forming the film packaging are preferably provided as heat-sealing seams.

As has already been stated in connection with the plastic film composite as primary product of the film packaging, the outer film can be provided with an imprint not covering the entire surface such that the imprint is omitted at least in the area of the heat-sealing seam.

As regards the film packaging according to the invention, the burst strength of the sealing seams and particularly the tear strength of the plastic film composite adjacent to the sealing seams is increased by the extrusion lamination. Therefore, the film packaging is also suitable for comparatively large fill volumes of one liter (L) or more to a particular degree. The fill volume can easily amount to more than 5 L, more than 10 L and more than 20 L.

According to a further aspect, the interior of the packaging is filled with at least 1 kg of a filling material and closed in an airtight manner. The mass of the filling material can also easily amount to more than 2 kg, more than 5 kg and more than 10 kg. Especially with such a comparatively heavy film packaging bag, the risk of unintentional bursting or tearing must be avoided. This also applies particularly when the film packaging is closed to be airtight and impacts accordingly also lead directly to a pressure surge.

Lastly, the subject matter of the invention is also a method for producing packaging containers, wherein an outer film is extruded and is oriented after extrusion in a separate method step with a draw ratio of between 1:3 and 1:12 along a production direction, wherein the outer film is imprinted, wherein a sealing film is formed by blown film extrusion, wherein the outer film and the sealing film are either both polyethylene-based or are both polypropylene-based, wherein the premade and oriented outer film and the premade sealing film are fed to a roll nip and connected there to form a plastic composite by means of a coextrusion lamination comprising at least one layer and based on polyolefin, wherein film packaging bags are formed from the plastic film composite by forming heat-sealing seams, and wherein the film packaging bags are filled and closed.

As regards further possible configurations of the method, reference is made to the foregoing descriptions relating to the film packaging and to the plastic film composite. To the extent that the individual method steps have not already been presented in sequence by the expressions employed, the sequence may be varied if necessary, although the indicated sequence a) to g) is preferred.

If the outer film is to be provided with reverse printing, for example, the printing must always be carried out before laminating with the sealing film. However, in case the outer film is provided with front-side printing, the corresponding method step can also be provided once the plastic film composite has been formed.

If premade bags are formed initially in the method according to the invention, method steps f) and g) are carried out with a time interval therebetween and usually also at different production sites.

However, in an FFS process, which is likewise possible, method steps f) and g) are carried out jointly or immediately following one another. For example, in a VFFS process a circumferentially closed film tube is generally produced first and is then provided with transverse sealing seams. The individual transverse sealing seams on one hand form the bottom of a bag blank which has yet to be filled and, on the other hand, the closing seam of the filled film packaging bag. The corresponding steps are familiar to the person skilled in the art from practice.

BRIEF DESCRIPTION OF THE DRAWINGS

The invention will be described in the following referring to figures which are merely exemplary. The drawings show.

DETAILED DESCRIPTION OF THE EMBODIMENTS

Figure 1:
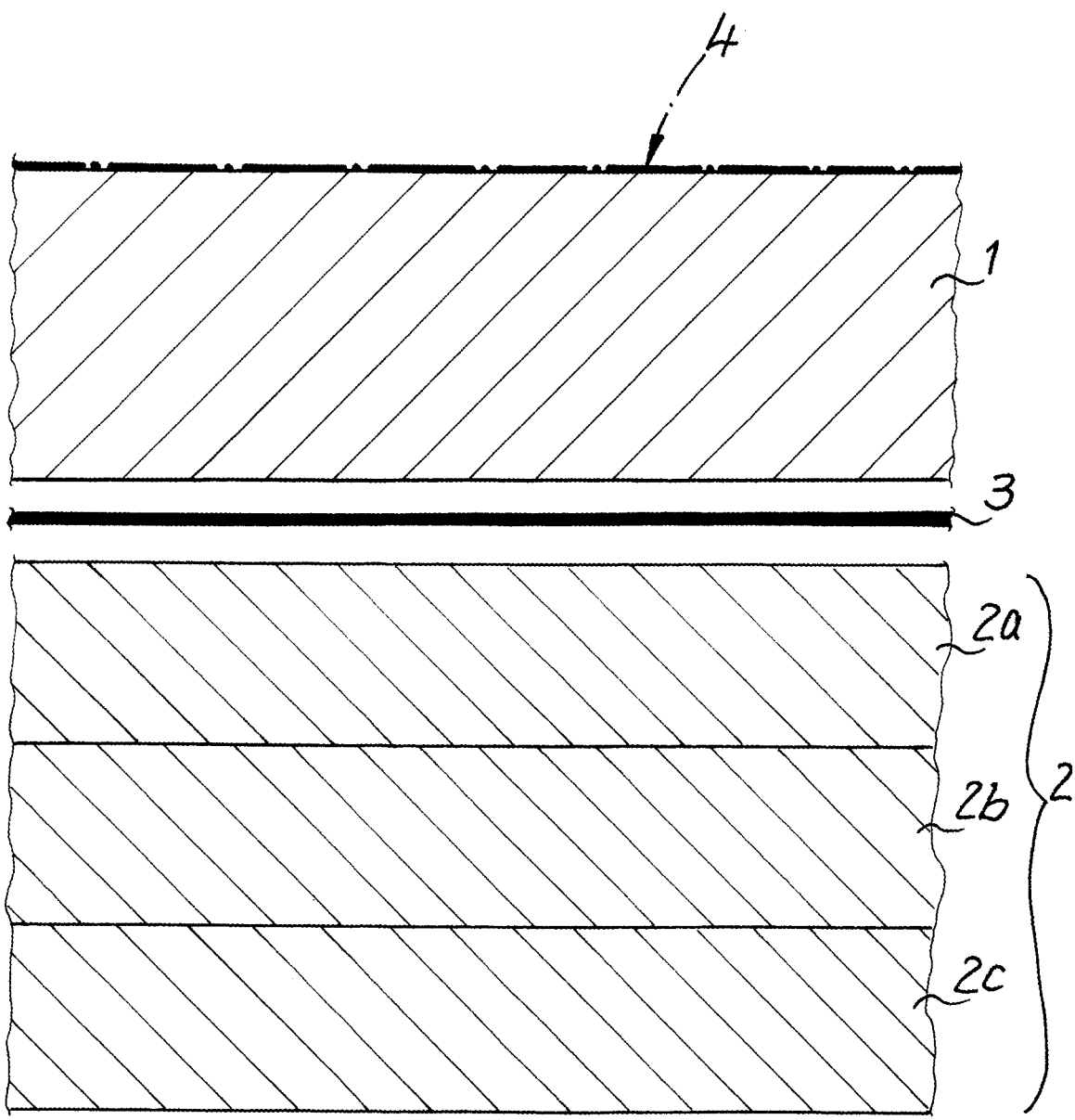
FIG. 1 a plastic film composite according to the prior art.

FIG. 1 shows a possible layer construction corresponding to the prior art. The following Table 1 is referred to in this respect. The plastic film composite comprises an outer film 1 of HDPE which is oriented in machine direction (MDO-HDPE) and has a thickness of 50 μm.

TABLE 1

| | Thickness/Weight per unit area | Material |
|---|---|---|
| Outer film | 50 μm | MDO-HDPE |
| Laminating adhesive | 2 g/m² | 2K PUR (solvent-free) |
| Sealing film | 20 μm | LLDPE + LDPE |
| (coex. blown film, | 20 μm | LMDPE + LDPE + TiO₂ |
| total thickness 60 μm) | 20 μm | LLDPE + LDPE |

The plastic film composite according to the prior art further comprises a sealing film 2 which is coextruded as blown film with a total thickness of 60 μm. In the depicted embodiment example, sealing film 2 comprises three layers 2a, 2b, 2c with a respective thickness of 20 μm. While the layer 2b arranged in the middle in sealing film 2 contains a blend of LMDPE and LDPE with an addition of titanium dioxide ($TiO_2$) as white batch, the rest of the layers 2a, 2c of the sealing film are formed from a blend of LLDPE and LDPE.

In the configuration according to the prior art, outer film 1 and sealing film 2 are connected by laminating adhesive 3 which is applied at a weight per unit area of 2 g/m². Taking into account typical densities, the layer of laminating adhesive consequently also has a thickness of approximately 2 μm. A polyurethane-based, solvent-free two-component adhesive (2K PUR) is provided as laminating adhesive 3.

Outer film 1 is usually provided with an imprint 4 which can be provided on the exposed outer side of outer film 1 as front-side printing or on the inner side on the side of outer film 1 facing the laminating adhesive 3 as reverse printing. FIG. 1 shows an exemplary embodiment of the imprint 4 as front-side printing.

Laminating adhesive 3 achieves a laminating strength sufficient to safeguard against a delamination between outer film 1 and sealing film 2 under normal load. In practice, however, it may come about especially under large mechanical loads that a film packaging 5 formed from the plastic film composite by heat-sealing seams 6 can burst unintentionally in an uncontrolled manner.

Figure 2:
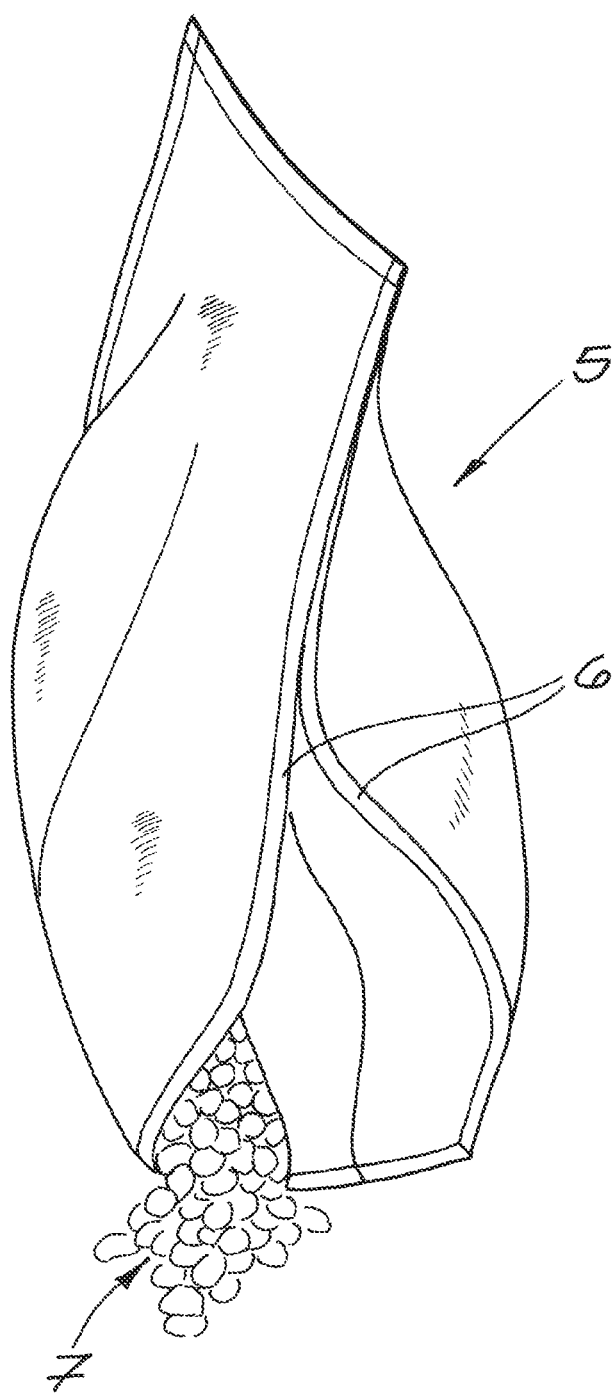
FIG. 2 a film packaging bag according to the prior art which is split at a sealing seam.

FIG. 2 shows an exemplary film packaging 5 of this kind in the form of a film packaging bag which is split open in a bottom area during a drop test so that filling material 7 exits in an uncontrolled manner and is no longer protected. It will be appreciated that an unwanted bursting of this kind must be prevented unconditionally in practice although a compromise must always be found between cost and the stability of the film packaging 5.

Upon close inspection of film packaging 5, it will be noted that an unwanted bursting often occurs due to tearing of the plastic film composite adjacent to the heat-sealing seam 6 rather than by a separation of the heat-sealing seam 6.

Figure 3:
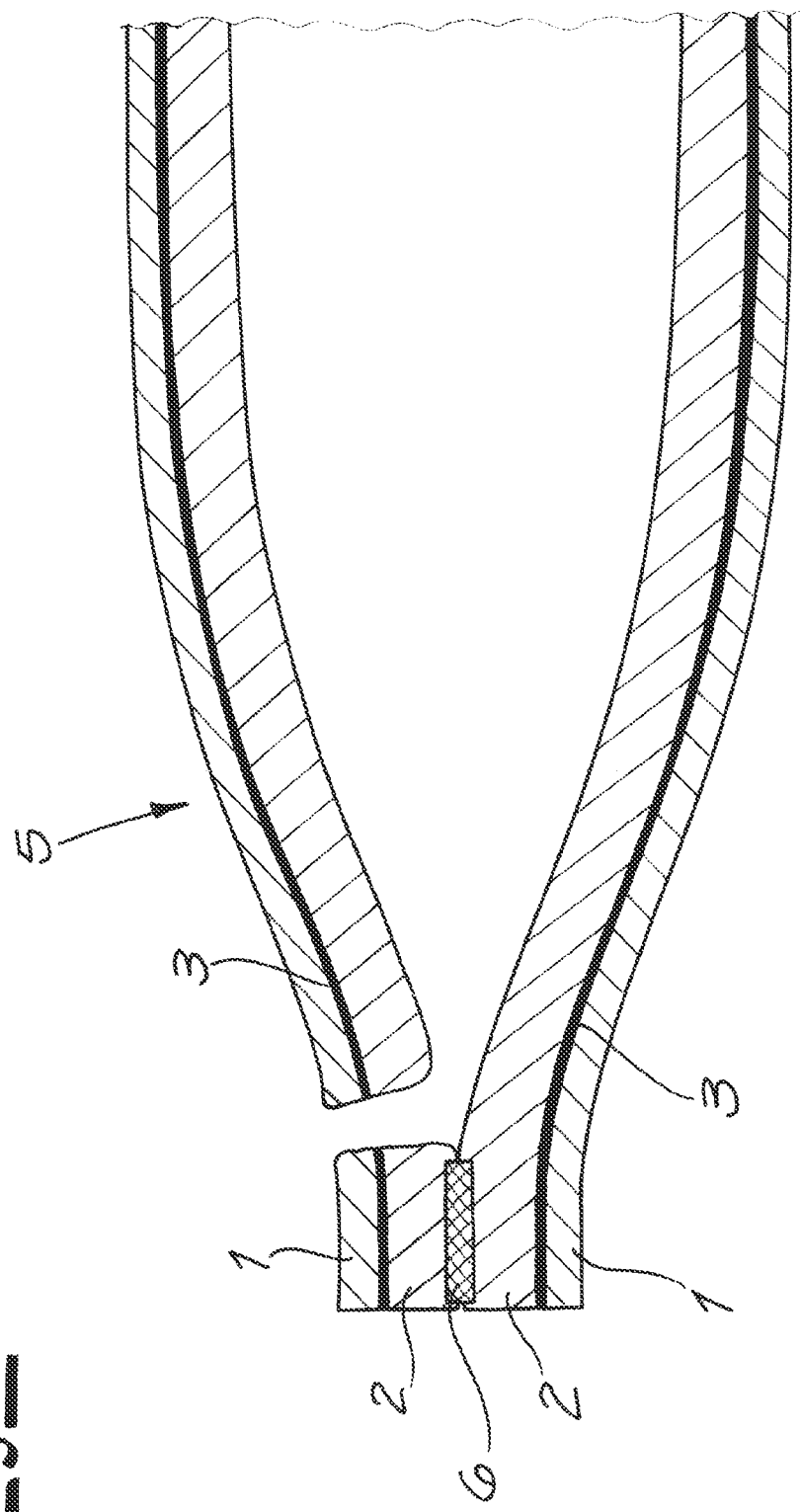
FIG. 3 a detailed view showing the breaking of the plastic film composite according to the prior art at a seam root of the sealing seam.

FIG. 3 correspondingly shows a typical fracture pattern of the plastic film composite according to the prior art lateral to the sealing seam 6, i.e., at the root of the heat-sealing seam 6.

Figure 4:
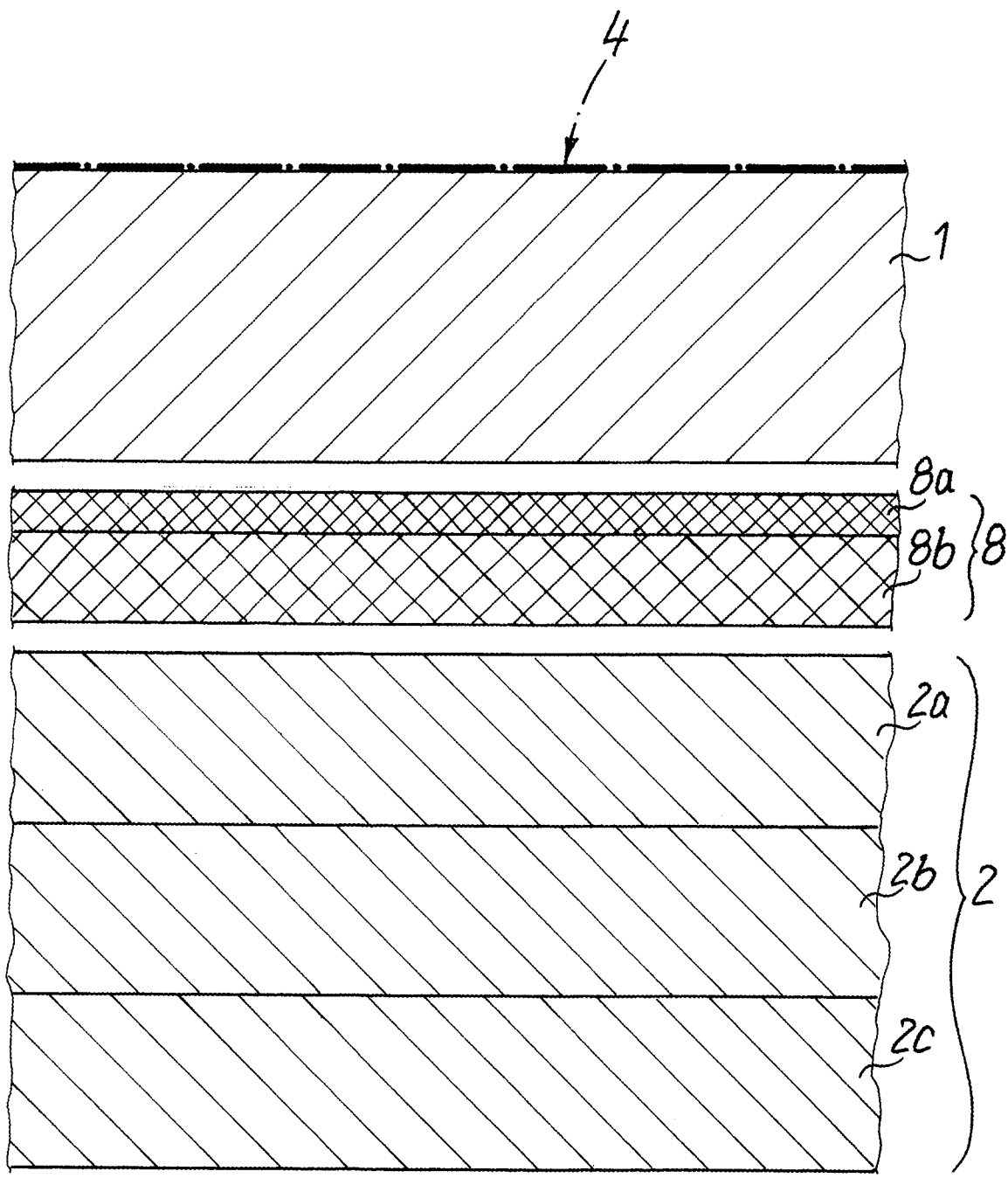
FIG. 4 a plastic film composite according to the invention with front-side printing on the outer side.

FIG. 4 shows a plastic film composite according to the invention in which outer film 1 and sealing film 2 are connected by an extrusion lamination 8 comprising at least one layer. As in FIG. 1, outer film 1, sealing film 2 and extrusion lamination 8 are shown separately for the sake of clarity but, of course, form a composite with directly joining layers.

The outer film 1 and the sealing film can be constructed as described above referring to FIG. 1. However, outer film 1 and sealing film 2 are not joined by a laminating adhesive 3 based on 2 K-PUR but by an extrusion lamination 8 which then forms at least one corresponding intermediate layer in the plastic film composite.

Figure 7:
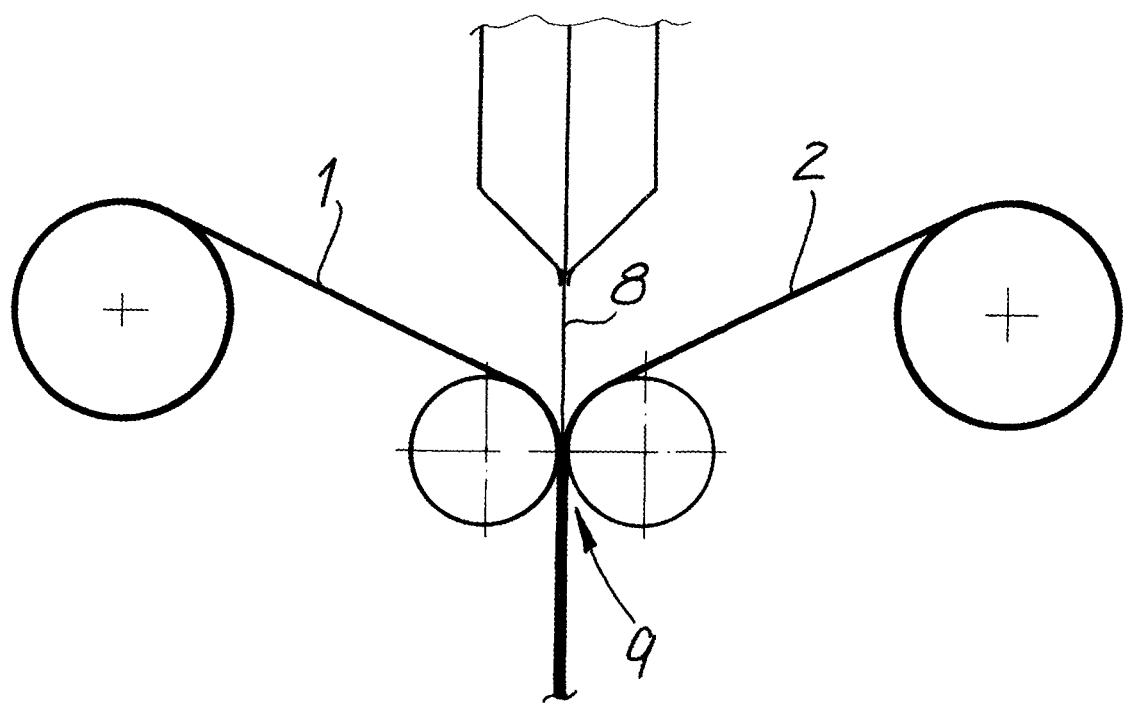
FIG. 7 a method step for forming the plastic composite.

The production of the plastic film composite by extrusion lamination is shown merely schematically in FIG. 7, wherein the premade outer film 1, after orientation in machine direction, and the premade sealing film 2 are fed to a roll nip 9 and laminated in the roll nip 9 with extrusion lamination 8 to form the plastic film composite.

Extrusion lamination 8 can comprise one or more layers. FIG. 4 shows an exemplary multiple-layered configuration with layers 8a, 8b of extrusion lamination 8.

Three embodiment examples differing only with respect to the material of the extrusion lamination 8 are given in Tables 2 to 4 for a layer sequence according to FIG. 4.

TABLE 2

|  | Thickness/Weight per unit area | Material |
|---|---|---|
| Outer film | 45 μm | MDO-HDPE |
| Extrusion lamination | 6 g/m² | 90 wt. % EAA-MAH (Lotader 4503) 10 wt. % SEBS-MAH (Kraton FG1901GT) |
|  | 14 g/m² | LDPE (Lupolen 2420K) |
| sealing film (coex. blown film, total thickness 60 μm | 20 μm 20 μm 20 μm | LLDPE + LDPE LMDPE + LDPE + TiO₂ LLDPE + LDPE |

TABLE 3

|  | Thickness/Weight per unit area | Material |
|---|---|---|
| Outer film | 45 μm | MDO-HDPE |
| Extrusion lamination | 6 g/m² | 50 wt. % LLDPE(M)-C6 (Exceed 2018HA) + 50 wt. % LDPE (Lupolen 2420K) |
|  | 14 g/m² | LDPE (Lupolen 2420K) |
| Sealing film (coex. blown film, total thickness 60 μm | 20 μm 20 μm 20 μm | LLDPE + LDPE LMDPE + LDPE + TiO₂ LLDPE + LDPE |

TABLE 4

|  | Thickness/Weight per unit area | Material |
|---|---|---|
| Outer film | 45 μm | MDO-HDPE |
| Extrusion lamination | 6 g/m² | HDPE (Borealis CG 8410) |
|  | 14 g/m² | LDPE (Borealis CT 7200) |
| Sealing film (coex. blown film, total thickness 60 μm | 20 μm 20 μm 20 μm | LLDPE + LDPE LMDPE + LDPE + TiO₂ LLDPE + LDPE |

According to the first embodiment example, outer film 1 is formed from MDO-HDPE with a thickness of 45 μm. An outer film 1 formed by flat film extrusion with a draw ratio of between 1:8 and 1:14, particularly with a draw ratio of between 1:10 and 1:12, is preferred. Sealing film 2 has a total thickness of 80 μm and is formed as coextruded blown film with three layers 2a, 2b, 2c. The middle layer of the sealing film 2b comprises a blend of LMDPE and LDPE with an addition of titanium dioxide (TiO₂) as white batch. The rest of the layers 2a, 2c of the sealing film with a thickness of 20 μm and 30 μm, respectively, comprise a blend of LLDPE and LDPE.

In all of the embodiment examples, the layers of extrusion lamination 8a, 8b are formed by way of example with the same weight per unit area of 6 g/m² and 14 g/m². Taking into account typical densities, the amount of the weight per unit area in g/m² approximately corresponds to the amount of the thickness in μm.

According to the first embodiment example, the layer 8a of extrusion lamination 8 that directly adjoins the outer film has 90% by weight of EAA-MAH (Lotader 4503) and 10% by weight SEBS-MAH (Kraton FG1901GT). The layer 8b of extrusion lamination that adjoins sealing film 2 is formed from LDPE (Lupolen 2420 K).

As mentioned previously, the embodiment examples according to the invention differ only with respect to the material of the extrusion lamination. According to the second embodiment example shown in Table 3, the layer 8a of extrusion lamination 8 that faces outer film 1 has 50% by weight LLDPE(M)-C6 (Exceed 2018 HA) and 50% by weight LDPE (Lupolen 2420 K). The layer 8b of extrusion lamination 8 that adjoins sealing film 2 comprises LDPE (Lupolen 2420 K).

According to the third embodiment example shown in Table 4, the layer 8a of extrusion lamination 8 that faces outer film 1 is formed from HDPE (Borealis CG 8410) and the layer 8b of the extrusion lamination that faces sealing film 2 is formed by LDPE (Borealis CT 7200).

In all of the embodiment examples, there is an appreciably stronger composite adhesion compared with lamination by means of laminating adhesive 3, which surprisingly also causes a substantial improvement in the stability of the plastic packaging with respect to tearing under compressive loading. This insight is surprising because the composite adhesion ultimately specifies the forces acting in thickness direction between the individual layers, while in case of bursting (see FIG. 2 and FIG. 3) which is sometimes unavoidable in the prior art, the plastic film composite tears along the thickness direction so that it must be assumed that the strength in the plane of the film (that is, transverse to the thickness direction) is decisive.

According to FIG. 4, an imprint 4 is provided as front-side printing such that the imprint 4 is located on the outer film 1 opposite extrusion lamination 8 and on the sealing film 2 adjoining the latter. The plastic film composites in all of the embodiment examples are suitable for a front-side printing. However, for reasons of cost, the embodiment examples 2 and 3 according to Tables 3 and 4 are preferred.

With reverse printing, on the other hand, there is the risk that the comparatively strong composite adhesion within the framework of the invention will be impaired. In particular, with a reverse printing the extrusion lamination 8 or the layer 8a facing the outer film 1 may not intimately bond with the material of the outer film 1 and, in particular, fuses to the material of outer film 1.

Figure 5:
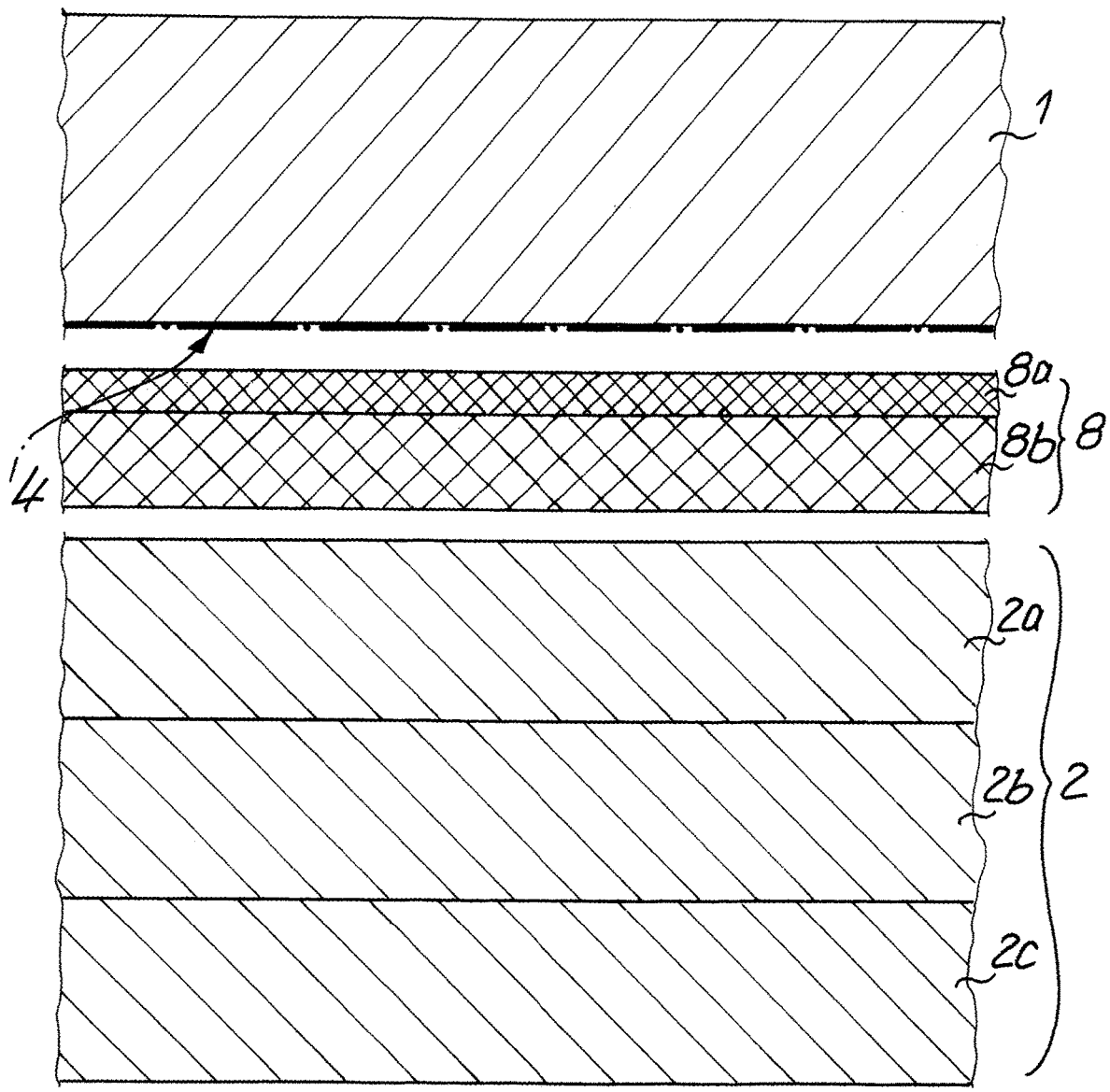
FIG. 5 a plastic film composite according to the invention with reverse printing on the inner side.
Figure 6:
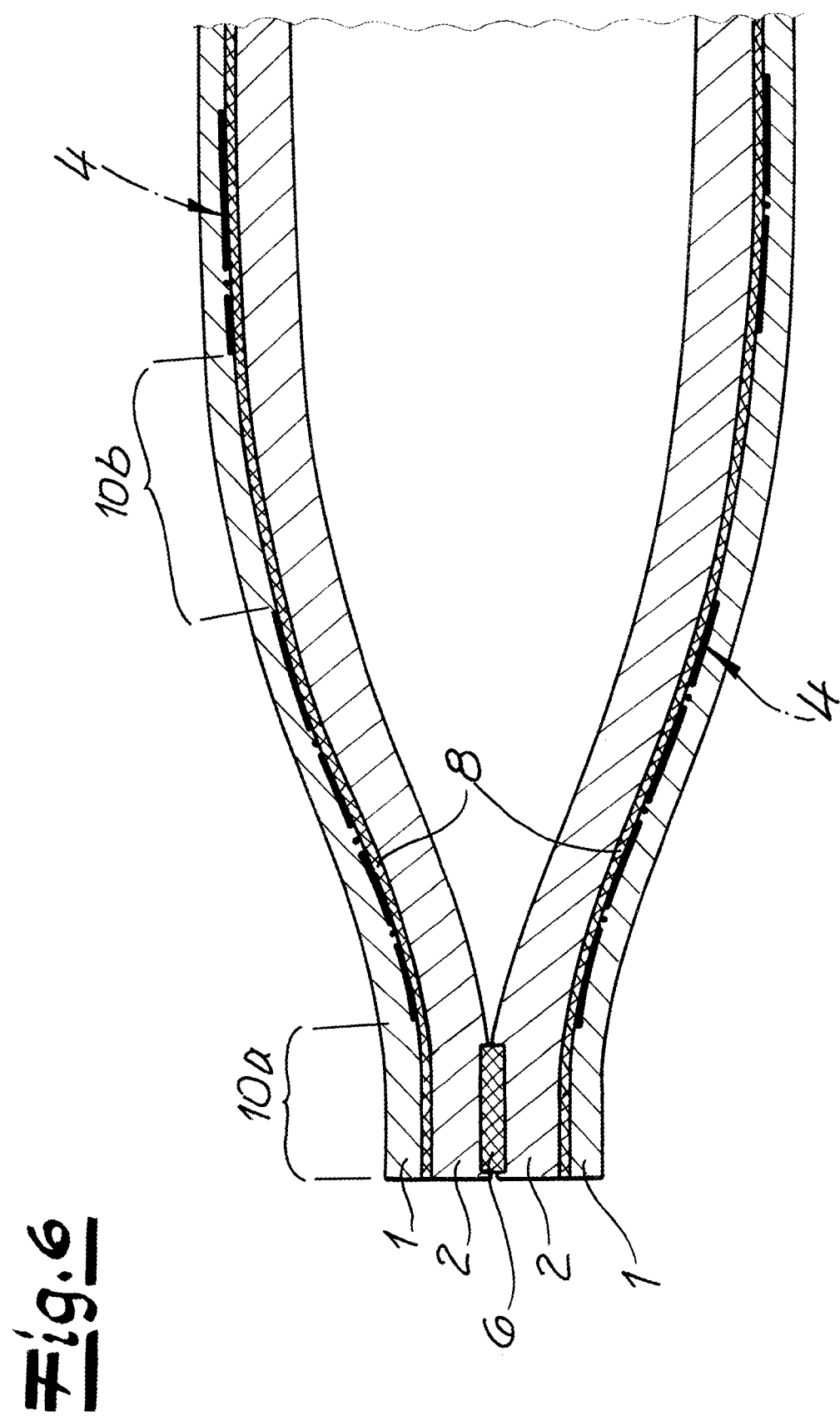
FIG. 6 a section corresponding to FIG. 3 for a film packaging bag according to the invention.

However, an exemplary reverse printing shown in FIG. 5 is possible particularly when the imprint 4 is not provided over the entire surface. In particular, according to FIG. 6, the area of the plastic film composite at which the heat-sealing seams 6 are generated when the film packaging 5 is formed can be left blank. Accordingly, there is an area 10a of greater composite adhesion in this location. Additional areas 10b with increased laminating strength can be generated as anchor points or anchor surfaces through further omission of imprint 4.

When the imprint 4 is not arranged over the entire surface in case of a reverse printing and, in particular, the areas of the heat-sealing seams 6 are left blank and/or are provided with the imprint 4 only on a small portion of the total surface area, the plastic film composites according to the three embodiment examples are well suited, an improved bonding being achieved by the polar groups provided in the extrusion lamination 8 according to the first embodiment example (Table 2).

While the composite adhesion between outer film 1 and sealing film 2 in the comparison example according to Table 1 is approximately 1 N/15 mm in a peel test according to DIN 53357, a laminating strength of greater than 3 N/15 mm is always observed in plastic film composites provided with front-side printing according to embodiment examples 1 to 3. Tests with filled film packaging 5 in the form of film packaging bags further show that the risk of tearing of the plastic film composite, particularly adjacent to a heat-sealing seam 6, is substantially reduced in embodiment examples 1 to 3 so that bursting is prevented or the risk of bursting can at least be substantially reduced also when the film packaging bag is unintentionally dropped, in case of shocks and impacts during transport and storage, or under other sudden loads.

When an imprint 3 is provided as reverse printing which also extends into the area of the heat-sealing seams according to a variant of the plastic film composite according to the invention, sufficient values can still be achieved for the composite adhesion depending on the printing ink and the material of the extrusion lamination 8 when the materials are suitably adapted to one another. Accordingly, it is expected that acceptable values for a composite adhesion can be achieved at least with the extrusion lamination 8 according to the first embodiment example (Table 2) with a polyvinylbutyral-based ink.

What is claimed is:

1. A plastic film composite for film packaging comprising;
   an oriented outer film,
   a sealing film which differs from the outer film, wherein both the oriented outer film and sealing film are polyethylene-based, and
   a polyolefin-based extrusion lamination comprising at least one layer, wherein the outer film and the sealing film are connected by the extrusion lamination,
   wherein the extrusion lamination adjoins a contact layer of the outer film either directly or partially via an imprint,
   wherein the extrusion lamination and the contact layer have as a main constituent a polymer of a polyethylene polymer class and
   wherein the composite adhesion between the outer film and the sealing film determined in a peel test according to DIN 53357 is greater than 2 N/15 mm, and wherein the extrusion lamination has a layer thickness greater than 10 μm.

2. The plastic film composite according to claim 1, wherein the extrusion lamination comprises a plurality of layers.

3. The plastic film composite according to claim 1, wherein the extrusion lamination directly adjoins the sealing film.

4. The plastic film composite according to claim 3, wherein the extrusion lamination has a maleic anhydride grafted polyolefin copolymer in a layer adjoining the outer film.

5. The plastic film composite according to claim 3, wherein the extrusion lamination has in a layer adjoining the outer film a thermoplastic elastomer (TPE) as admixture in a weight proportion of between 3 and 50% by weight.

6. The plastic film composite according to claim 1, wherein the outer film is formed by flat film extrusion and has a draw ratio of between 1:8 and 1:14.

7. The plastic film composite according to claim 1, wherein the outer film is formed by blown film extrusion and has a draw ratio of between 1:3 and 1:8.

8. The plastic film composite according to claim 1, wherein the outer film has at least one layer with medium-density polyethylene or high-density polyethylene as a main constituent.

9. The plastic film composite according to claim 1, wherein the outer film is coextruded in multiple layers.

10. The plastic film composite according to claim 8, wherein the outer film is coextruded in at least three layers and has cover layers with low-density polyethylene as a main constituent.

11. The plastic film composite according to claim 1, wherein the outer film has a thickness of between 15 μm and 80 μm.

12. The plastic film composite according to claim 1, wherein the outer film is imprinted on an inner side in direction of the extrusion lamination, wherein the imprint extends over 10% to 95% of the surface area of the outer film.

13. The plastic film composite according to claim 1, wherein the sealing film is formed by blown film extrusion.

14. The plastic film composite according to claim 1, wherein the sealing film is coextruded in multiple layers.

15. The plastic film composite according to 1, wherein the sealing film has a thickness of between 30 μm and 140 μm.

16. The plastic film composite according to claim 1, wherein the sealing film is formed based on low-density polyethylene.

17. The plastic film composite according to claim 1, wherein the sealing film contains a pigment.

18. The plastic film composite according to claim 1, wherein the weight proportion of polyolefin relative to all of the polymer constituents amounts to at least 80% by weight.

19. The plastic film composite according to claim 1, wherein the total thickness is between 50 μm and 200 μm.

20. A film packaging comprising a plastic film composite according to claim 1, wherein the outer film forms an outer side, the sealing film faces an interior of the packaging, and wherein the interior of the packaging is bounded by at least one heat-sealing seam formed at the sealing film.

21. The film packaging according to claim 20, wherein the outer film is provided with an imprint not covering an entire surface of the film packaging such that the imprint is omitted at least in an area of the heat-sealing seam.

22. The film packaging according to claim 20, wherein the packaging interior has a fill volume of at least 1 L (liter).

23. The film packaging according to claim 20, wherein the packaging interior is filled with at least 1 kg of a filling material and closed in an airtight manner.

24. A method for the production of packaging containers, comprising:
   a) extruding an outer film and orienting the outer film after extrusion in a separate method step with a draw ratio of between 1:3 and 1:12 along a production direction,
   b) imprinting the outer film,
   c) forming a sealing film by blown film extrusion, wherein the outer film and the sealing film are both polyethylene-based,
   d) feeding the oriented outer film and the sealing film to a roll nip and connecting the outer film and sealing film to form a plastic composite by means of an extrusion lamination comprising at least one layer and based on polyethylene, wherein the extrusion lamination adjoins a contact layer of the outer film either directly or partially via the imprint, and wherein the composite adhesion between the outer film and the sealing film determined in a peel test according to DIN 53357 is greater than 2 N/15 mm,
   e) forming film packaging bags from the plastic composite by forming heat-sealing seams, and
   f) filling and closing the film packaging bags, wherein the extrusion lamination has a layer thickness greater than 10 μm.

* * * * *